United States Patent
Suchen et al.

(10) Patent No.: US 8,055,210 B2
(45) Date of Patent: Nov. 8, 2011

(54) TRANSCEIVER FOR RADIO-FREQUENCY COMMUNICATION

(75) Inventors: Hongru Suchen, Hsinchu (TW); Ping Chin Tseng, Hsinchu (TW)

(73) Assignee: Microelectronics Technology, Inc., Hsinchu (TW)

( * ) Notice: Subject to any disclaimer, the term of this patent is extended or adjusted under 35 U.S.C. 154(b) by 709 days.

(21) Appl. No.: 12/141,010

(22) Filed: Jun. 17, 2008

(65) Prior Publication Data

US 2009/0163149 A1    Jun. 25, 2009

(30) Foreign Application Priority Data

Dec. 25, 2007    (TW) ................................ 96149890 A

(51) Int. Cl.
*H04B 1/46* (2006.01)
(52) U.S. Cl. ................ 455/81; 455/78; 455/80; 455/82; 455/114.1; 455/114.2; 455/63.1; 455/296; 455/323; 455/325; 333/135; 333/137; 333/21 A
(58) Field of Classification Search .............. 455/78–83, 455/114.1–114.2, 296, 323, 325, 328, 63.1; 333/1.1, 21 A, 125–126, 129, 135, 137
See application file for complete search history.

(56) References Cited

U.S. PATENT DOCUMENTS

| | | | | |
|---|---|---|---|---|
| 2,908,872 A * | 10/1959 | Kenton | ........................... | 333/1.1 |
| 4,758,806 A * | 7/1988 | Mohring et al. | .............. | 333/135 |
| 4,777,654 A * | 10/1988 | Conti | ............................... | 455/81 |
| 4,837,531 A * | 6/1989 | Gourlain et al. | ............. | 333/135 |
| 5,486,836 A * | 1/1996 | Kuffner et al. | ......... | 343/700 MS |
| 5,784,033 A * | 7/1998 | Boldissar, Jr. | ................ | 343/786 |
| 6,583,683 B2 * | 6/2003 | Schubert et al. | ............ | 333/21 A |
| 6,636,127 B2 * | 10/2003 | Van Meter | ..................... | 333/125 |
| 7,078,985 B2 * | 7/2006 | Guguen et al. | ................ | 333/135 |

\* cited by examiner

*Primary Examiner* — Tuan A Tran
(74) *Attorney, Agent, or Firm* — WPAT, P.C.; Anthony King

(57) ABSTRACT

A transceiver for radio-frequency communication comprises a waveguide, a transmitting port, a receiving port and a receiver load termination. The waveguide receives and transmits radio-frequency signals. The transmitting port is connected to the waveguide and transmits the radio-frequency signals to the waveguide. The receiving port is connected to the waveguide and receives the radio-frequency signals from the waveguide. The receiver load termination is connected to the waveguide and removes the vertical polarization components of the receiving radio-frequency signals. The receiver load termination includes a filtering unit to reduce the energy of the transmitting radio-frequency signals entering the receiver load termination.

9 Claims, 2 Drawing Sheets

TRANSCEIVER FOR RADIO-FREQUENCY COMMUNICATION

BACKGROUND OF THE INVENTION (A) Field of the Invention

The present invention relates to a radio-frequency communication transceiver, and more particularly, to a radio-frequency communication transceiver with a receiver load termination.

(B) Description of the Related Art

Conventional radio-frequency (RF) transceiver design comprises a waveguide to receive an RF signal, which is then processed by an analog processing unit, such as an analog IC. The RF signal is then further processed by a digital processing unit, such as a digital IC.

In conventional RF communication systems, such as an RF satellite transceiver, the receiving signals are received at an IO port of a waveguide, conducted to a receiving port, and then forwarded to an analog processing unit. For transmitting, on the other hand, the transmitting signals are outputted from the analog processing unit via a transmitting port to the waveguide and then are conducted to the IO port of the waveguide.

However, the vertical polarization component of the receiving RF signals should be removed to prevent RF transceivers from malfunctioning while receiving RF signals. Therefore, conventional RF transceivers may further comprise a receiver load termination to remove the reflecting signals of the receiving RF signals. The receiver load termination can remove the polarized signals perpendicular to the receiving RF signals.

When RF transceivers transmit RF signals, however, some portions of the transmitting RF signals may pass the receiver load termination to cause energy loss of the transmitting RF signals and the quality thereof is jeopardized. Therefore, there is a need to design an RF transceiver to reduce the energy loss of the transmitting RF signals.

SUMMARY OF THE INVENTION

The embodiment of the present invention is a transceiver for radio-frequency communication comprising a waveguide, a transmitting port, a receiving port and a receiver load termination. The waveguide receives and transmits radio-frequency signals. The receiving port is connected to the waveguide and receives the radio-frequency signals from the waveguide. The transmitting port is connected to the waveguide and transmits the radio-frequency signals to the waveguide. The receiver load termination is connected to the waveguide and removes the vertical polarization components of the receiving radio-frequency signals. The receiver load termination includes a filtering unit to reduce the energy of the transmitting radio-frequency signals entering the receiver load termination.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
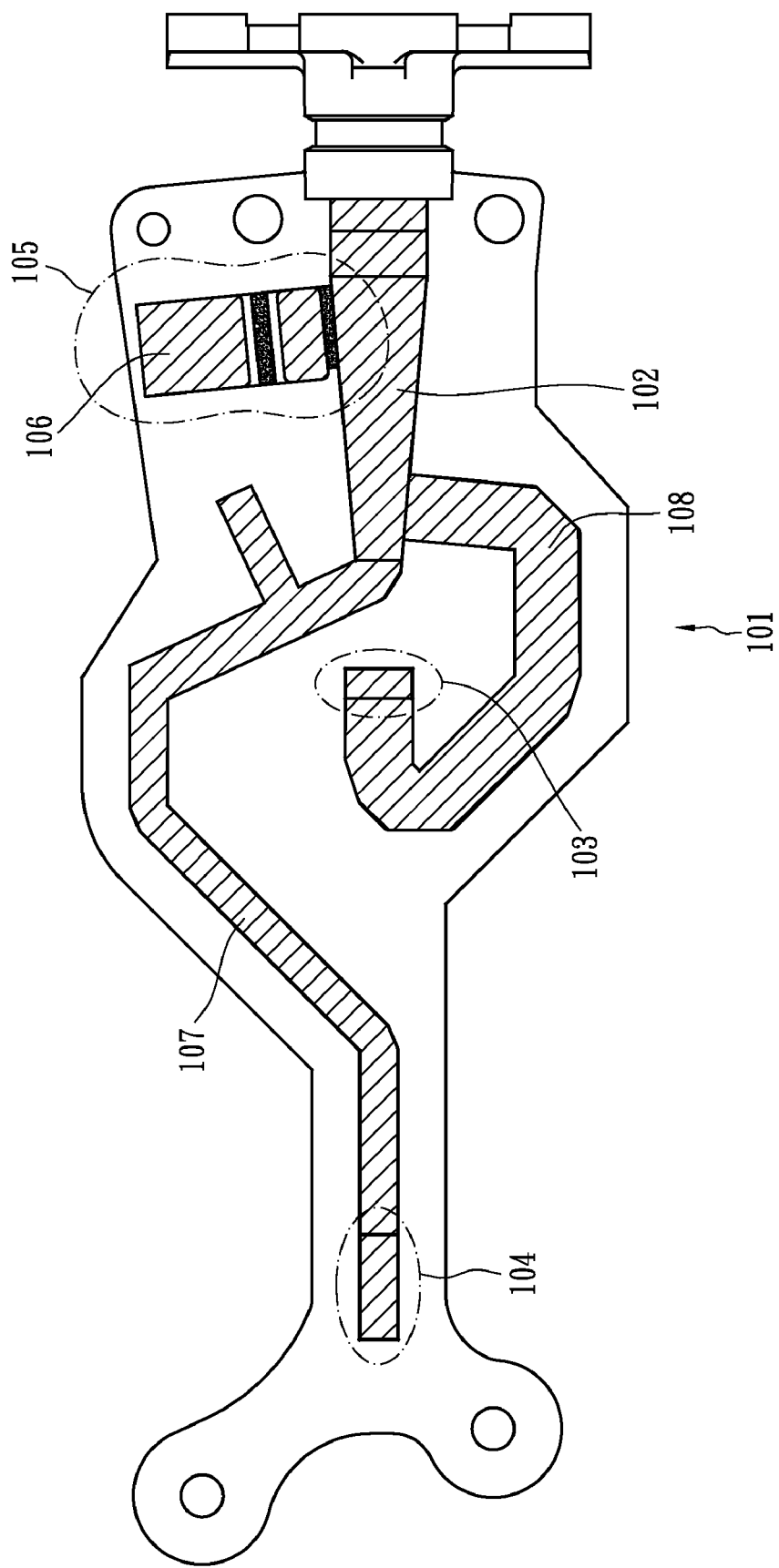
FIG. 1 shows a transceiver for radio-frequency communication of an embodiment of the present invention.

FIG. 1 shows a transceiver for radio-frequency communication of the embodiment of the present invention. The transceiver 101 comprises a waveguide 102, a transmitting port 103, a receiving port 104 and a receiver load termination 105. The waveguide 102 includes a first winding branch channel 108 and a second winding branch channel 107. The waveguide 102 receives RF signals, such as RF satellite signals, input to the transceiver 101 and transmits RF signals output by the transceiver 101. The transmitting port 103 is connected to the first winding branch channel 108 of the waveguide 102 and transmits the RF signals to the waveguide 102. The receiving port 104 is connected to the second winding branch channel 107 of the waveguide 102 and receives the RF signals from the waveguide 102. The receiver load termination 105 is connected to the waveguide 102 to remove the vertical polarization components of the receiving signals therein and is covered at the bottom by a stair-formed absorption material 106. To reduce the energy loss due to the transmitting signals entering the receiver load termination 105, the receiver load termination 105 includes a filtering unit to prevent the transmitting signals from entering the receiver load termination 105.

Figure 2:
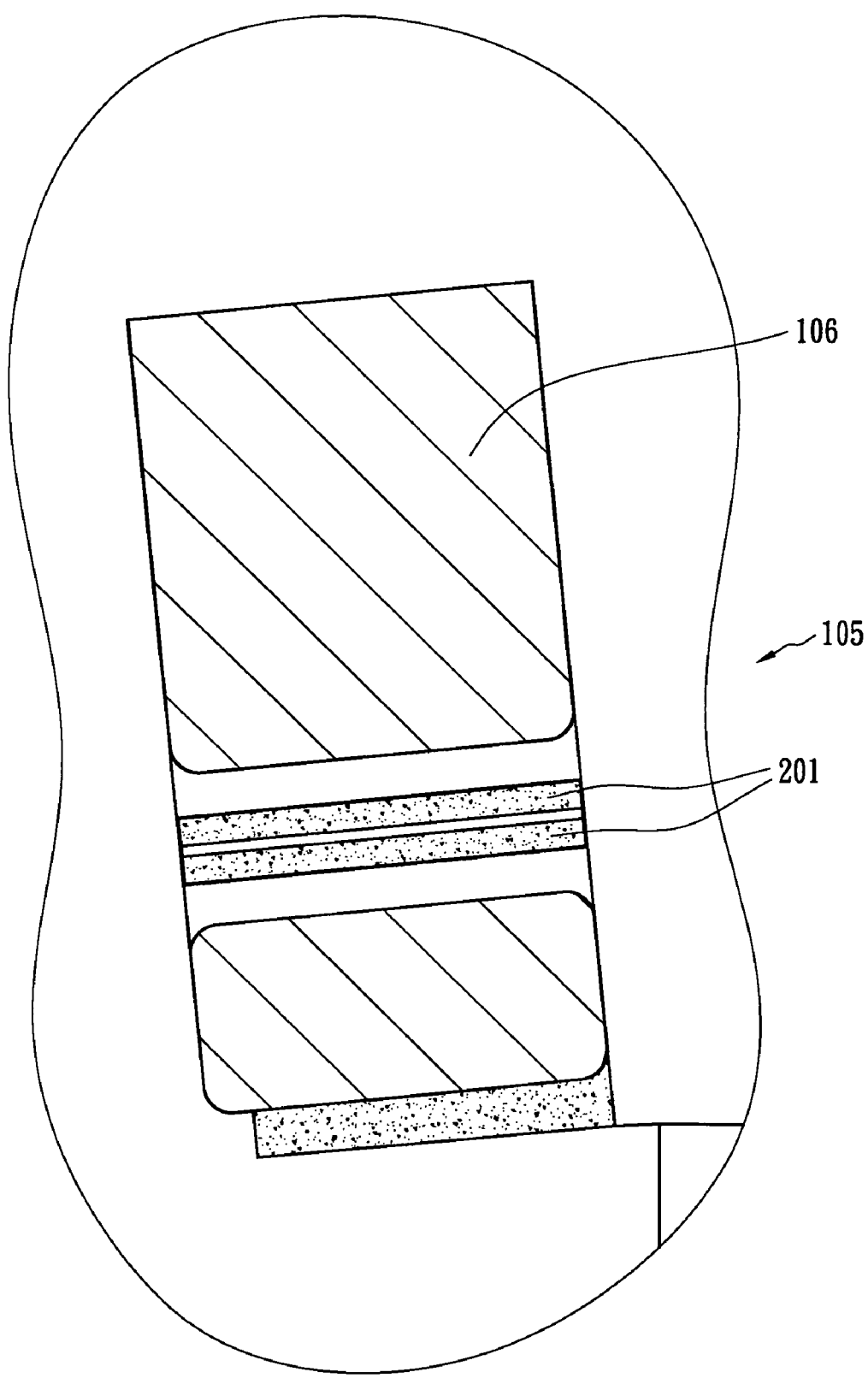
FIG. 2 shows a receiver load termination of an embodiment of the present invention.

FIG. 2 shows an enlarged figure of the receiver load termination 105 in FIG. 1. As shown in FIG. 2, there is a plurality of parallel raised ridges 201 settled at the middle plane of the receiver load termination 105 that combines with the plane of the receiver load termination 105 to form a band-pass filter. The band-pass filter is permeable for the vertical polarization components of receiving signals of the transceiver 101 but not to the transmitting signals of the same. Therefore, the problem of the energy loss of the transmitting signals due to the absorption material 106 is prevented.

Referring to FIG. 1, transmitting port 103 is connected to the end of a branch channel of the waveguide 102. Therefore, the transmitting RF signals are transmitted in side-mode. The receiving port 104 is connected to the end of the main channel of the waveguide 102. Therefore, the receiving RF signals are received in main-mode. Significantly, the transmitting and receiving mode of the transceiver of the present invention is not restricted by the transceiver 101 in FIG. 1. That is, the transmitting port 103 may be connected to the end of the main channel of the waveguide 102 and transmits RF signals in main-mode, while the receiving port 104 may be connected to the end of a branch channel of the waveguide 102 and receives RF signals in side-mode. The receiver load termination 105 can still be applied to reduce the energy loss due to the transmitting signals entering the receiver load termination 105.

The above-described embodiments of the present invention are intended to be illustrative only. Those skilled in the art may devise numerous alternative embodiments without departing from the scope of the following claims.

What is claimed is:

1. A transceiver for radio-frequency communication comprising:

a waveguide, including a first winding branch channel, and a second winding branch channel, wherein the waveguide is configured for receiving and transmitting radio-frequency signals;

a transmitting port connected to an end of the first winding branch channel of the waveguide and transmitting the radio-frequency signals to the waveguide;

a receiving port connected to an end of the second winding branch channel of the waveguide and receiving the radio-frequency signals from the waveguide; and a receiver load termination connected to the waveguide and removing the vertical polarization components of the receiving radio-frequency signals, wherein the receiver load termination includes an absorption material to remove the vertical reflecting signal of the receiving radio-frequency signal in the receiver load termination; wherein the receiver load termination includes a filtering unit to reduce the energy of the transmitting radio-frequency signals entering the receiver load termination, and the filtering unit is a band-pass filter formed by a plane and a plurality of parallel-raised ridges thereon.

2. The transceiver of claim 1, wherein the transmitting port is connected to the end of a branch channel of the waveguide.

3. The transceiver of claim 2, wherein the transmitting radio-frequency signals are transmitted in side-mode.

4. The transceiver of claim 1, wherein the receiving port is connected to the end of the main channel of the waveguide.

5. The transceiver of claim 4, wherein the receiving radio-frequency signals are received in main-mode.

6. The transceiver of claim 1, wherein the receiving port is connected to the end of a branch channel of the waveguide.

7. The transceiver of claim 6, wherein the receiving radio-frequency signals are received in side-mode.

8. The transceiver of claim 1, wherein the transmitting port is connected to the end of the main channel of the waveguide.

9. The transceiver of claim 8, wherein the transmitting radio-frequency signals are transmitted in main-mode.

* * * * *